(12) United States Patent
Leach et al.

(10) Patent No.: US 7,293,953 B2
(45) Date of Patent: Nov. 13, 2007

(54) INTEGRATED TURBINE SEALING AIR AND ACTIVE CLEARANCE CONTROL SYSTEM AND METHOD

(75) Inventors: David Leach, Simpsonville, SC (US); Douglas Frank Beadie, Greer, SC (US); Tagir Robert Nigmatulin, Greenville, SC (US); Brittany Dees, Greenville, SC (US); Jesse E. Trout, Simpsonville, SC (US); Daniel Waugh, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 11/273,074

(22) Filed: Nov. 15, 2005

(65) Prior Publication Data
US 2007/0110564 A1 May 17, 2007

(51) Int. Cl.
*F03B 11/00* (2006.01)

(52) U.S. Cl. .................. 415/14; 415/116; 415/173.1

(58) Field of Classification Search .................. 415/14, 415/115, 116, 127, 173.1, 175
See application file for complete search history.

(56) References Cited

U.S. PATENT DOCUMENTS

| | | | | |
|---|---|---|---|---|
| 4,462,204 A | * | 7/1984 | Hull | 415/115 |
| 4,513,567 A | * | 4/1985 | Deveau et al. | 415/178 |
| 4,576,547 A | * | 3/1986 | Weiner et al. | 415/116 |
| 4,596,116 A | * | 6/1986 | Mandet et al. | 415/178 |
| 4,893,984 A | * | 1/1990 | Davison et al. | 415/48 |
| 5,048,288 A | * | 9/1991 | Bessette et al. | 415/116 |
| 5,685,693 A | | 11/1997 | Sexton et al. | |
| 5,993,150 A | * | 11/1999 | Liotta et al. | 415/115 |
| 6,152,685 A | * | 11/2000 | Hagi | 415/14 |
| 6,422,807 B1 | | 7/2002 | Leach et al. | |
| 6,925,814 B2 | * | 8/2005 | Wilson et al. | 415/178 |

* cited by examiner

*Primary Examiner*—Igor Kershteyn
(74) *Attorney, Agent, or Firm*—Nixon & Vanderhye PC

(57) ABSTRACT

An active clearance control system is provided that uses compressor extraction air to manipulate blade tip clearance in an industrial gas turbine and compressor. A stream of air is taken from a cooling and sealing air circuit and redirected to be used for active clearance control. The spent clearance control air is re-introduced into the hot gas path of the gas turbine for cooling and sealing purposes.

10 Claims, 3 Drawing Sheets

INTEGRATED TURBINE SEALING AIR AND ACTIVE CLEARANCE CONTROL SYSTEM AND METHOD

BACKGROUND OF THE INVENTION

The present invention relates to a gas turbine having an active clearance control system.

U.S. Pat. No. 5,685,693, the disclosure of which is incorporated herein by this reference, discloses an industrial gas turbine having a turbine outer shell surrounding an inner shell supporting non-rotational parts of certain of the stages. Particularly, the inner shell supports the first and second-stage nozzles, as well as the first and second-stage shrouds. The outer shell directly supports the nozzles and shrouds of additional stages. It will be appreciated that each of the inner and outer shells is formed in circumferentially extending sections about the rotor axis, typically in two circumferential halves (upper and lower) of 180° each. In the above patent, the inner shell is supported by pins extending between the inner and outer shells in a manner preventing circumferential, axial and radial movement of the shells relative to one another while enabling radial expansion and contraction of the inner shell relative to the outer shell for controlling clearance between the shrouds and the bucket tips.

In the above-noted patent, the clearance control system includes a pair of plenums in each of the inner shell halves, which plenums are connected one to the other by a passageway. Particularly, for each inner shell half, the first or forward plenum overlying the first-stage shrouds and bucket tips has an inlet for receiving cooling air, the cooling air flowing circumferentially about the plenum to the mid-line of the inner shell half. Axially extending passages along diametrically opposite mid-lines extend from the forward plenum back to a similar circumferentially extending aft plenum overlying the second-stage shrouds and buckets. An outlet is provided in the aft plenum. Thus, cooling air at steady-state operation from an external air source is supplied to the first-stage plenum inlet for flow about the plenum, axially along the mid-line and about the second-stage plenum to the outlet. It will be appreciated that by flowing a thermal medium in the described thermal circuit, the inner shell may contract and expand in a radial direction in response to flow of the thermal medium. Consequently, by controlling the thermal expansion or contraction in a radial direction of the inner shell relative to the tips of the buckets of the first and second stages, tip clearance control is afforded. With the advent of a further advanced gas turbine design by assignee, there has, however, been demonstrated a need for an enhanced inner shell cooling circuit.

In U.S. Pat. No. 6,422,807, the disclosure of which is incorporated herein by this reference, another clearance control system is disclosed. That gas turbine design includes an inner shell having inner shell halves each having a forward and aft section containing plenums communicating with one another such that a thermal medium may be supplied to one section for flow axially to the other section and return to the one section. Particularly, for each inner shell half, the thermal medium is supplied via an inlet for circumferential flow in a first plenum of the first inner shell half section and for flow generally axially along a first set of passageways in communication with a first plenum of the second section for circumferential flow therein. The first plenum of the second section communicates with a second plenum of the second section whereby the flow reverses direction for flow circumferentially about the second section and then along a second set of axial passageways along the mid-line of the inner shell half to the second plenum of the first section. The flow enters circumferentially extending second passage portions in the second plenum of the first section for exit and return to the thermal medium supply.

BRIEF DESCRIPTION OF THE INVENTION

Maximum combined cycle output and efficiency are achieved when the gas turbine blade tip clearance are maintained as tight as possible through the load and ambient temperature range. Therefore, it is advantageous to have a system that actively controls the gas turbine and compressor blade tip clearances.

Thus, the invention may be embodied in an active blade tip clearance control system for controlling blade tip clearances in a gas turbine and compressor assembly comprising: a flow path for directing a stream of compressor bleed air to circulate through a passage defined in at least one of (1) an inner turbine shell and (2) a compressor discharge casing to actively control the blade tip clearances therein; and a flow path for directing spent control air to discharge into at least one of (1) the gas turbine's outer side wall cavity and (2) the gas turbine exhaust.

The invention may also be embodied in a method for controlling blade tip clearances in a gas turbine and compressor assembly comprising: directing a stream of compressor bleed air for circulation through at least one of (1) an inner turbine shell and (2) a compressor discharge casing to actively control the blade tip clearances therein and then discharging spent control air into at least one of (1) the gas turbine's outer side wall cavity and (2) the gas turbine exhaust.

In accordance with a further example embodiment of the invention, a clearance control system is provided that is integrated with the gas turbine cooling and sealing air system to control the gas turbine and compressor blade tip clearances. More specifically, in this further example embodiment of the invention, an integrated turbine sealing air and active clearance control system is provided for a turbine having a compressor including a compressor discharge casing and a rotor including axially spaced buckets carried thereby forming parts of turbine stages, an outer containment shell, an inner shell about the rotor including nozzles carried thereby forming other parts of said turbine stages and shrouds about the respective tips of said buckets of said stages, and a passage formed in said inner shell for flow of thermal medium to control thermal movement of said inner shell, the system comprising: a cooling and sealing air path for directing compressor bleed air from the compressor to the turbine shell for at least one of bucket cooling and sealing; and a active clearance control path in selective flow communication with said cooling and sealing air path for directing a part of said compressor bleed air to circulate to and through at least one of (1) said passage in the inner shell at a first-axial location corresponding in part to an axial location of at least one of a first stage and a second stage of said turbine and (2) to said compressor discharge casing, thereby to actively control blade tip clearances therein.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
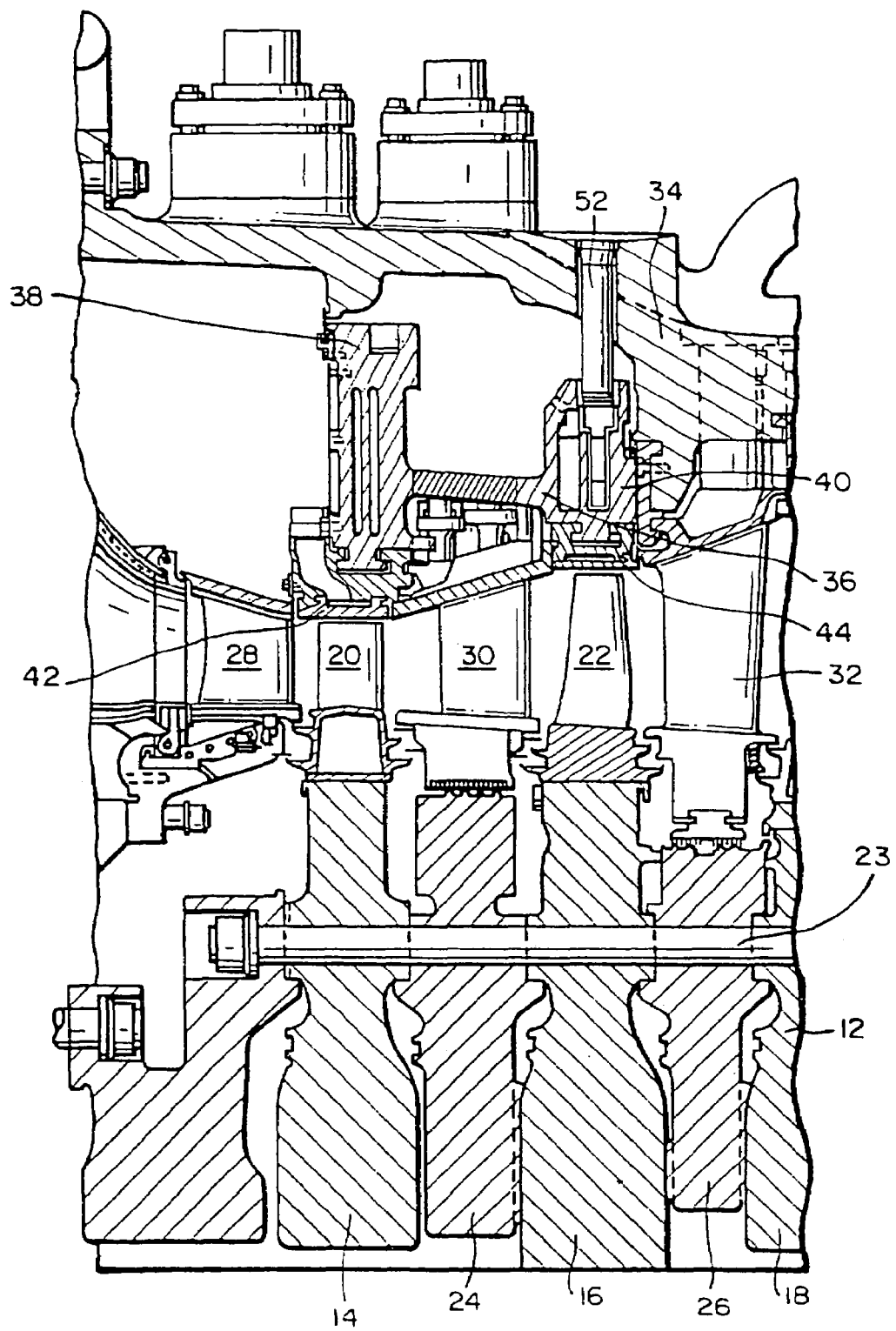
FIG. 1 is a fragmentary cross-sectional view through a portion of the gas turbine illustrating portions of the inner and outer shells.

Referring now to the drawings, particularly to FIG. 1, there is illustrated a portion of a gas turbine incorporating the present invention. The turbine includes a rotor 12, only a portion of which is illustrated, and which comprises turbine wheels 14, 16 and 18, each carrying a circular array of buckets, the buckets 20 and 22 for wheels 14 and 16 being illustrated. Spacers or disks 24, 26 are interposed between the wheels and the stack-up of wheels and spacers are bolted together by bolts 23 to form the rotor 12. Nozzles are likewise arranged in circumferential arrays, alternating with the buckets of the wheels, nozzles 28, 30 and 32 being illustrated. It will be appreciated that the first stage of the turbine comprises nozzles 28 and buckets 20; the second stage, nozzles 30 and buckets 22; the third stage, nozzles 32 and buckets for wheel 18, and so on, depending upon the number of stages of the gas turbine.

The gas turbine includes an outer structural containment shell 34 and an inner shell 36. Each outer shell and inner shell is formed in semi-circular sections joined along a horizontal mid-line, the upper halves of the outer and inner shells being illustrated. The inner shell 36 includes forward and aft shell sections 38 and 40, respectively, mounted for radial contraction and expansion relative to the outer shell 34 by pins 52. An arrangement of pins for mounting the inner shell and outer shell to one another is described in U.S. Pat. No. 5,685,693. Suffice to say that the inner shell may expand and contract radially in a controlled manner relative to the rotor for adjusting the clearance between the shrouds 42 and 44 carried by the forward and aft shells, respectively. Hence, the inner shell is adjustable radially relative to the tips of the buckets of the corresponding stages, i.e., respective buckets 20 and 22.

Thus, for example, during turbine startup, heated air may be supplied for circulation in the various passages of the inner shell halves to radially expand the inner shell and hence displace the shrouds radially further outwardly than the tips of the buckets. It will be appreciated that the inner shell thus heats up at a greater rate than the rotor to ensure that adequate clearance is maintained between the shrouds and the bucket tips during startup. In steady-state operations, the temperature of the air supplied the inner shell can be adjusted to contract or expand the inner shell relative to the bucket tips thereby to afford a minimum clearance between the shrouds and bucket tips and enhance the efficiency of the turbine operation. During turbine shutdown, it is important to maintain the rate of contraction of the inner shell less than the rate of contraction of the rotor and buckets to avoid contact between the turbine tips and the shrouds. To that end, the temperature of the thermal medium can be adjusted so that a controlled tip clearance during shutdown is maintained.

Figure 2:
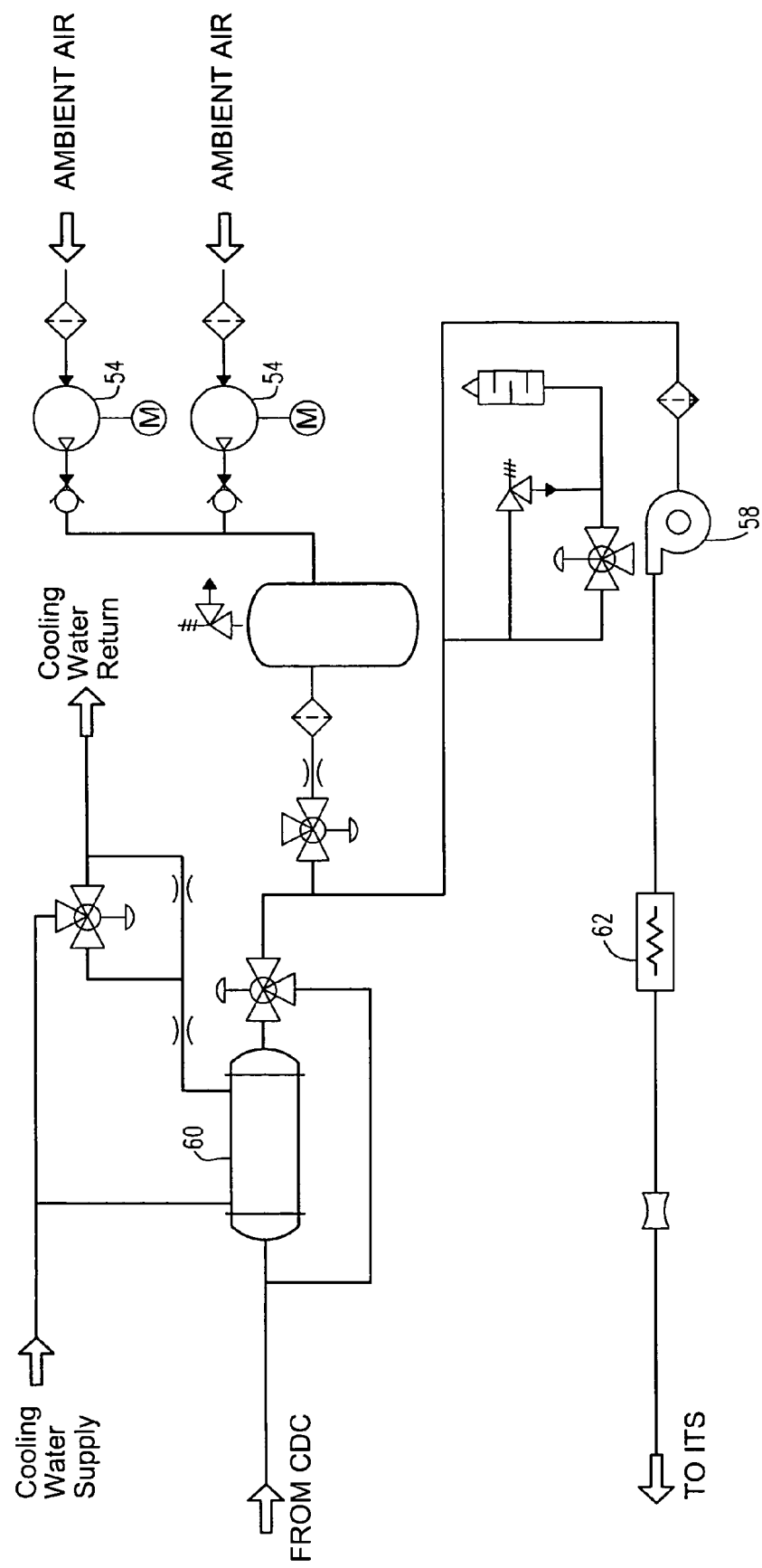
FIG. 2 is a schematic illustration of a clearance control system design according to a related art.

A clearance control system according to a related art charges ambient air to a specified pressure, heats it to a set temperature based on gas turbine mode, and circulates the air through the inner turbine shell and compressor discharge casing. Such a system is schematically depicted in FIG. 2 and is used to control the blade tip clearances of the gas turbine and compressor. As mentioned, the system takes ambient air and compresses it via charging compressors 54. The ambient air is continually compressed and added to the system until the mass flow rate achieves the set point at the specified system exit temperature. This air is then circulated through a closed loop system including the inner turbine shell (ITS) and compressor discharge casing (CDC) via a circulating compressor 58. The air exiting the CDC is cooled at heat exchanger 60 to meet the inlet temperature requirements of the circulating compressor 58 and then reheated at 62 to the system temperature set point based on the gas turbine's compressor discharge temperature.

As understood from the schematic illustration of FIG. 2, the clearance control system depicted therein is in the form of a module containing charging compressors 54, circulating compressor 58, heater 62, heat exchanger 60, and moisture separator 64. If a hotter, pressurized source of air is identified to use for active clearance control, the majority of the components included in the FIG. 2 system can be eliminated. Eliminating complex hardware from this system as above proposed, by providing a simpler solution using high temperature pressurized air to achieve active clearance control, will enhance the system's reliability. Furthermore, during gas turbine startup and at base load, a clearance control system as depicted in FIG. 2 will consume a significant amount of auxiliary power, which results in a performance loss. If the majority of the components can be eliminated as proposed herein, the auxiliary power consumption will decrease significantly.

A clearance control system configuration is proposed herein to be integrated with the gas turbine cooling and sealing air system, to control the gas turbine and compressor blade tip clearances. The configuration of an example embodiment of the invention is schematically depicted in FIG. 3.

Figure 3:
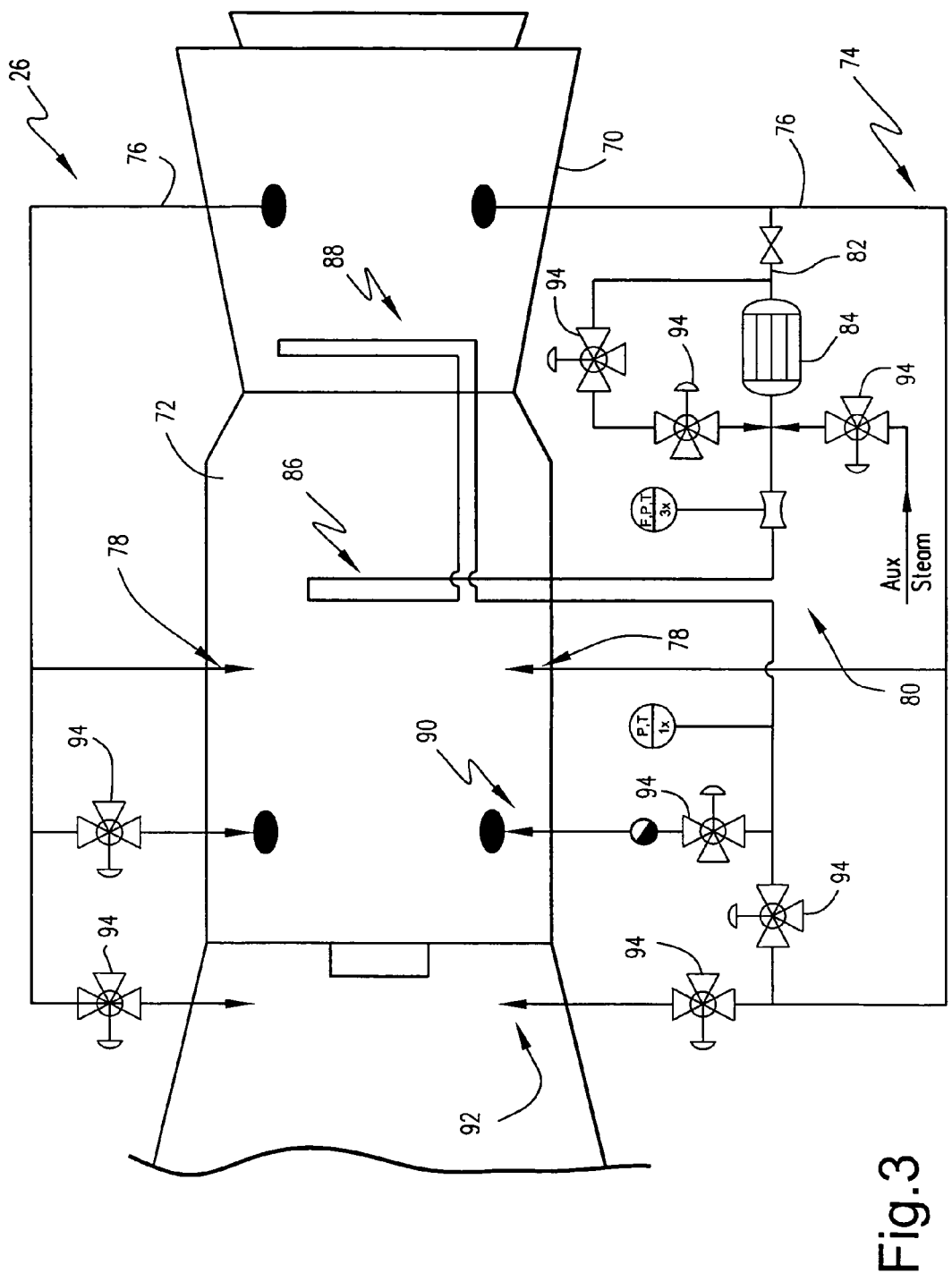
FIG. 3 is a schematic illustration of a clearance control system embodying the invention.

Referring more specifically to FIG. 3, wherein the compressor 70 and inner turbine shell 72 are schematically illustrated, a cooling and sealing air system 74 is provided for directing compressor bleed air through cooling air path 76 for bucket cooling and sealing as indicated at 78. The clearance control system, schematically depicted at 80, receives a stream 82 of compressor bleed air taken from the typical cooling and sealing air circuit 74 and uses it for active clearance control. In order to achieve base load operation, a heat exchanger 84 is provided to cool the extraction air to the required temperature.

Once the bleed air reaches the temperature required by the inner turbine shell 72 to achieve the desired amount of heat transfer, the temperature controlled air is circulated through the inner turbine shell (ITS) as schematically shown at 86 and then to the compressor discharge casing (CDC) as schematically shown at 88 to actively control the gas turbine blade tip clearances as in the '807 patent. Once the air has circulated through the inner turbine shell and the compressor discharge casing, it is discharged into the gas turbine's outer side wall cavity (OSWC) as at 90 and/or into the exhaust as at 92. As illustrated, multiple control valves 94 are provided both in the typical cooling and sealing air circuit 74 and in the clearance control system 80 added according to this example embodiment of the invention to regulate the flow of the compressor bleed air, and the flow of air into the turbine's outer side wall cavity and into the exhaust.

As will be understood from a consideration of the clearance control system of the invention, the new design eliminates the need for a complex clearance control skid, reducing the need for expensive hardware. Furthermore, the heat exchanger 84 incorporated in the system depicted in FIG. 3 can be relatively small and consequently the proposed system does not consume additional space in the power plant that would be required for housing a skid. Moreover, because the design depicted in FIG. 3 has fewer complex hardware components and less instrumentation hardware, the clearance control system reliability is improved. Finally, a clearance control system embodying the invention enhances the gas turbine's performance since it reduces the amount of auxiliary power consumed by the clearance control system at base load.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An active blade tip clearance control system for controlling blade tip clearances in a gas turbine and compressor assembly comprising:
    a flow path for directing a stream of compressor bleed air to circulate through a passage defined in to extend through at least a portion of an inner turbine shell to actively control the blade tip clearances therein and through at least a portion of a compressor discharge casing to actively control the blade tip clearances therein; and
    a flow path for directing spent control air to discharge into at least one of (1) an outer side wall cavity of the gas turbine and (2) an exhaust of the gas turbine.

2. An active blade tip clearance control system as in claim 1, wherein said flow path for directing said stream of compressor bleed air is in flow communication with a flow path for compressor bleed air in a cooling and sealing air circuit for said gas turbine for selectively directing a portion of said compressor bleed air in said cooling and sealing air circuit to circulate through said passage for actively controlling the blade tip clearances.

3. An active blade tip clearance control system as in claim 1, further comprising a heat exchanger for selectively controlling a temperature of said stream of compressor bleed air.

4. An integrated turbine sealing air and active clearance control system for a turbine having a compressor including a compressor discharge casing and a rotor including axially spaced buckets carried thereby forming parts of turbine stages, an outer containment shell, an inner shell about the rotor including nozzles carried thereby forming other parts of said turbine stages and shrouds about the respective tips of said buckets of said stages, and a passage formed in said inner shell for flow of thermal medium to control thermal movement of said inner shell, the system comprising:
    a cooling and sealing air path for directing compressor bleed air from the compressor to the turbine shell for at least one of bucket cooling and sealing; and
    an active clearance control path in selective flow communication with said cooling and sealing air path for directing a part of said compressor bleed air to circulate to and through said passage in the inner shell at a first axial location corresponding in part to an axial location of at least one of a first stage and a second stage of said turbine to actively control blade tip clearances therein and through said compressor discharge casing, thereby to actively control blade tip clearances therein.

5. An integrated system as in claim 4, further comprising a heat exchanger for selectively controlling a temperature of said part of said compressor bleed air to a target level.

6. An integrated system as in claim 4, further comprising a passage for discharging the air circulated through said passage in said inner shell and said compressor discharge casing into at least one of (1) an outer side wall cavity of the gas turbine and (2) into the turbine exhaust.

7. An integrated system as in claim 4, further comprising a plurality of control valves along said flow path for clearance control air and said flow path for cooling and sealing air for selectively controlling flow through said respective passages.

8. A method for controlling blade tip clearances in a gas turbine and compressor assembly comprising:
    directing a stream of compressor bleed air for circulation through an inner turbine shell to actively control the blade tip clearances therein and through a compressor discharge casing to actively control the blade tip clearances therein, and then discharging spent control air into at least one of (1) an outer side wall cavity of the gas turbine and (2) an exhaust of the gas turbine.

9. A method as in claim 8, wherein said stream of compressor bleed air is taken from a stream of compressor bleed air in a cooling and sealing air circuit.

10. A method as in claim 8, wherein said stream of compressor bleed air is circulated through a heat exchanger for selectively controlling a temperature thereof.

* * * * *